US010381666B2

(12) United States Patent
Ohkuwa et al.

(10) Patent No.: US 10,381,666 B2
(45) Date of Patent: Aug. 13, 2019

(54) FUEL CELL SYSTEM WITH CONTROL DEVICE FOR DETERMINING WHEN TO START UP FUEL CELL

(71) Applicant: TOYOTA JIDOSHA KABUSHIKI KAISHA, Toyota-shi, Aichi-ken (JP)

(72) Inventors: Yoshihiro Ohkuwa, Toyokawa (JP); Taiki Ikeda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/845,283

(22) Filed: Dec. 18, 2017

(65) Prior Publication Data
US 2018/0183077 A1    Jun. 28, 2018

(30) Foreign Application Priority Data

Dec. 26, 2016 (JP) ................. 2016-250839

(51) Int. Cl.
| | | |
|---|---|---|
| *H01M 8/04089* | (2016.01) | |
| *C01B 3/00* | (2006.01) | |
| *G05D 7/06* | (2006.01) | |
| *H01M 8/04082* | (2016.01) | |
| *H01M 8/0438* | (2016.01) | |

(Continued)

(52) U.S. Cl.
CPC ......... *H01M 8/04104* (2013.01); *B60L 58/31* (2019.02); *C01B 3/00* (2013.01); *G05D 7/0617* (2013.01); *H01M 8/04089* (2013.01); *H01M 8/04201* (2013.01); *H01M 8/04225* (2016.02); *H01M 8/04302* (2016.02); *H01M 8/04388* (2013.01); *H01M 8/04425* (2013.01); *H01M 8/04686* (2013.01); *H01M 2250/20* (2013.01); *Y02E 60/324* (2013.01); *Y02T 90/32* (2013.01)

(58) Field of Classification Search
CPC ......... H01M 8/04104; H01M 8/04425; H01M 8/04686; H01M 8/04225; H01M 8/04302; H01M 8/04089; H01M 8/04201; H01M 8/04388; H01M 2250/20; B60L 11/1885; G05D 7/0617; C01B 3/00; Y02E 60/324; Y02T 90/32
USPC ........................................... 429/446
See application file for complete search history.

(56) References Cited

U.S. PATENT DOCUMENTS

| | | | |
|---|---|---|---|
| 5,678,410 A | 10/1997 | Fujita et al. | |
| 2008/0152972 A1* | 6/2008 | Igarashi | H01M 8/04022 429/410 |
| 2016/0116450 A1 | 4/2016 | Saito | |

FOREIGN PATENT DOCUMENTS

| | | |
|---|---|---|
| JP | 07-85883 A | 3/1995 |
| JP | 2006-141122 A | 6/2006 |

(Continued)

*Primary Examiner* — Gary D Harris
(74) *Attorney, Agent, or Firm* — Finnegan, Henderson, Farabow, Garrett & Dunner, LLP (57) ABSTRACT

A control device of a fuel cell system includes a sensor state determining unit and a power generation control unit. A sensor state determining unit performs sensor state determining control before a first startup of the fuel cell after supply complete timing into a first tank and a second tank based on first pressure detected by a first pressure sensor at the supply complete timing, and second pressure detected by a second pressure sensor after a valve is opened. A power generation control unit starts up the fuel cell only when the sensor state determining unit determines that the first pressure sensor and the second pressure sensor are normal.

6 Claims, 4 Drawing Sheets

(51) Int. Cl.
*H01M 8/04664* (2016.01)
*H01M 8/04302* (2016.01)
*H01M 8/04225* (2016.01)
*B60L 58/31* (2019.01)

(56) References Cited

FOREIGN PATENT DOCUMENTS

| | | |
|---|---|---|
| JP | 2010-003527 A | 1/2010 |
| JP | 2012-58203 | 3/2012 |
| JP | 2016-84844 | 5/2016 |

* cited by examiner

FUEL CELL SYSTEM WITH CONTROL DEVICE FOR DETERMINING WHEN TO START UP FUEL CELL

INCORPORATION BY REFERENCE

The disclosure of Japanese Patent Application No. 2016-250839 filed on Dec. 26, 2016 including the specification, drawings and abstract is incorporated herein by reference in its entirety.

BACKGROUND

1. Technical Field

The present disclosure relates to a fuel cell system.

2. Description of Related Art

Fuel cell systems supplying electric power using hydrogen gas are in practical use. Fuel cells each serving as a power generator include electrodes called an anode and a cathode. Fuel cells each generate electric power by causing a electrochemical reaction using hydrogen gas supplied to an anode and oxidation gas supplied to a cathode.

Japanese Unexamined Patent Application Publication No. 2016-84844 (JP 2016-84844 A) discloses a fuel cell system mounted in a fuel cell vehicle. The fuel cell system includes a tank as a supply source of hydrogen. When hydrogen gas is supplied into the tank, the hydrogen gas flows into the tank through a first path. Meanwhile, when the fuel cell generates electric power, hydrogen gas is supplied to the fuel cell from the tank through a second path. There is provided a first pressure sensor configured to detect pressure of hydrogen gas. The second path includes a second pressure sensor configured to detect pressure of hydrogen gas supplied to the fuel cell from the tank.

The fuel cell system described in JP 2016-84844 A performs abnormality determination of the first pressure sensor and the second pressure sensor. Specifically, the fuel cell system first calculates a difference between pressure detected by the first pressure sensor when hydrogen gas fills the tank, and pressure detected by the second pressure sensor when the hydrogen gas is first supplied to the fuel cell after the filling of the hydrogen gas. In addition, when the difference is within a predetermined range, the fuel cell system determines that there is no abnormality in any of the first pressure sensor and the second pressure sensor.

SUMMARY

The fuel cell system described in JP 2016-84844 A, more specifically, detects pressure of hydrogen gas with the second pressure sensor when the fuel cell first starts to generate electric power after the tank is filled with hydrogen gas while supplying hydrogen gas to the fuel cell. That is, the aforementioned abnormality determination of the first pressure sensor and the second pressure sensor needs to be performed with startup of the fuel cell. Thus, the fuel cell system described in JP 2016-84844 A may not use a result of the abnormality determination for startup of the fuel cell.

The present disclosure provides a fuel cell system capable of using a result of abnormality determination of a pressure sensor for startup of a fuel cell.

A fuel cell system according to an aspect of the present disclosure includes a fuel cell configured to generate electric power by an electrochemical reaction with supplied hydrogen gas, a tank in which hydrogen gas is stored, a first path through which hydrogen gas is supplied into the tank, a first pressure sensor configured to detect pressure of hydrogen gas in the first path, a second path through which hydrogen gas is supplied from the tank to the fuel cell, a second pressure sensor configured to detect pressure of hydrogen gas in the second path, a valve configured to open and close the second path in response to a received control signal, and a control device configured to receive a detection signal from each of the first pressure sensor and the second pressure sensor, and to transmit a control signal to controls the valve. The control device includes a supply state determining unit configured to perform supply state determining control for determining a supply state of hydrogen gas to the tank, a sensor state determining unit configured to perform sensor state determining control for determining a state of each of the first pressure sensor and the second pressure sensor, and a power generation control unit configured to control power generation of the fuel cell. The sensor state determining unit is configured to perform the sensor state determining control before a first startup of the fuel cell after supply complete timing being timing when supply of hydrogen gas into the tank is completed, based on first pressure detected by the first pressure sensor at the supply complete timing, and second pressure detected by the second pressure sensor after the valve is opened. The power generation control unit is configured to start up the fuel cell only when the sensor state determining unit determines that the first pressure sensor and the second pressure sensor are normal.

According to this structure, the sensor state determining unit performs the sensor state determining control before the first startup of the fuel cell after the supply complete timing being timing when supply of hydrogen gas into the tank is completed. The sensor state determining control is performed based on the first pressure detected by the first pressure sensor at the supply complete timing, and the second pressure detected by the second pressure sensor after the valve is opened.

Then, the power generation control unit starts up the fuel cell only when the sensor state determining unit determines that the first pressure sensor and the second pressure sensor are normal. Thus, according to the above structure, a result of the sensor state determining control can be used for startup of the fuel cell.

The sensor state determining unit may start to perform the sensor state determining control based on a case where the supply complete timing arrives. According to this configuration, the sensor state determining control can be started to be performed before the first startup of the fuel cell after the supply complete timing. As a result, a result of the sensor state determining control can be reliably used for startup of the fuel cell When the first pressure sensor and the second pressure sensor are normal, the first pressure and the second pressure detected by the corresponding sensors are almost equal to each other. Meanwhile, when one of the first pressure sensor and the second pressure sensor is abnormal, there is a difference between the first pressure and the second pressure.

Thus, the sensor state determining unit may be configured to determine that at least one of the first pressure sensor and the second pressure sensor is abnormal when a difference between the first pressure and the second pressure is more than a predetermined value. According to this configuration, abnormality of at least one of the first pressure sensor and the second pressure sensor can be reliably determined.

The supply state determining unit may be configured to determine that supply of hydrogen gas into the tank is completed based on a case where an inlet of the first path is closed. According to this configuration, completion of supply of hydrogen gas into the tank can be reliably determined with a simple structure.

The fuel cell system may include a storage unit that stores at least one of the first pressure and the second pressure, and the power generation control unit may be configured to start up the fuel cell only when at least one of the first pressure and the second pressure stored in the storage unit is more than a predetermined value. According to this configuration, the power generation control unit starts up the fuel cell when a sufficient amount of hydrogen gas is stored inside the tank. As a result, startup of the fuel cell in spite of only a little amount of hydrogen gas stored inside the tank can be prevented, so that unnecessary electric power consumption can be reduced.

All of the supply state determining unit, the sensor state determining unit, and the power generation control unit may be configured to he provided in a single control device. According to this configuration, a result of the sensor state determining control can be acquired without performing unnecessary communication among the supply state determining unit, the sensor state determining unit, and the power generation control unit.

According to the present disclosure, it is possible to provide a fuel cell system capable of using a result of abnormality determination of a pressure sensor for startup of a fuel cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments will be described below with reference to accompanying drawings. For easy understanding of description, the same component in each of the drawings is designated by the same reference numeral as far as possible without duplicated description on the component.

Figure 1:
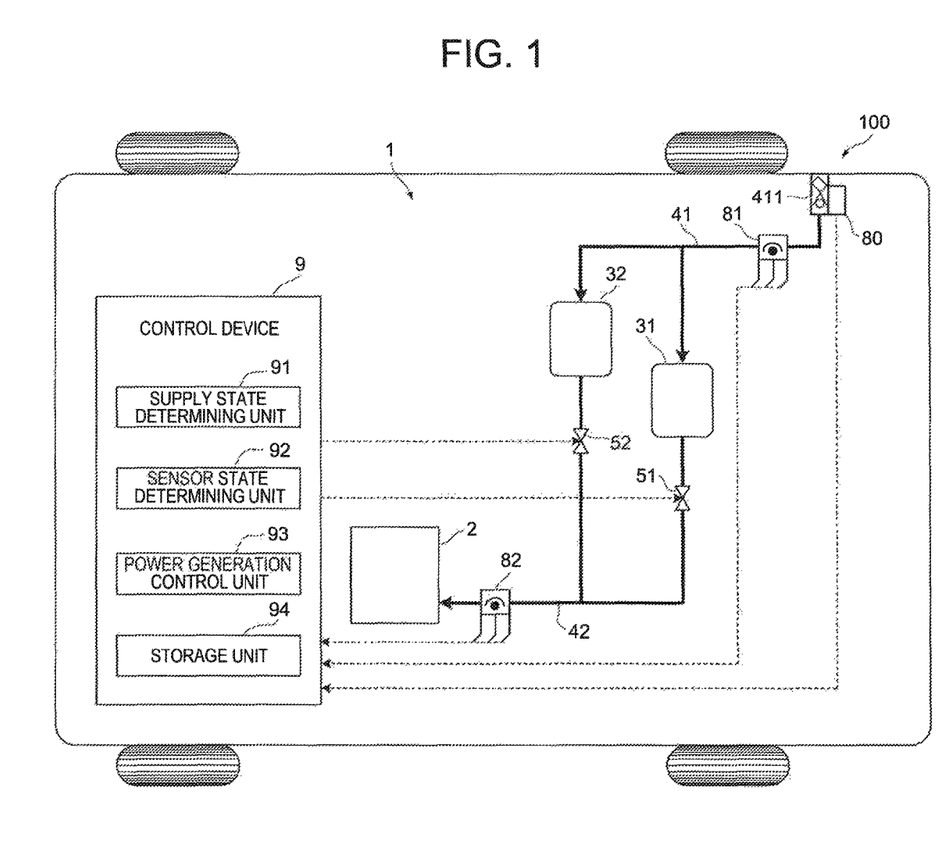
FIG. 1 is a block diagram illustrating a fuel cell system according to an embodiment.

First, a fuel cell system 1 according to an embodiment will he described with reference to FIG. 1. FIG. 1 is a block diagram illustrating the fuel cell system 1. FIG. 1 illustrates only a part of structure provided in the fuel cell system 1.

The fuel cell system 1 is mounted in a vehicle 100. The vehicle 100 is a so-called fuel-cell vehicle. That is, the vehicle 100 includes an AC motor (not illustrated) as a power source, and travels by driving the AC motor using electric power supplied from the fuel cell system.

The fuel cell system 1 includes a fuel cell 2. The fuel cell 2 is a polymer electrolyte fuel cell formed by stacking a plurality of single cells (not illustrated). Each of the single cells includes electrodes called an anode and a cathode, and a polymer electrolyte membrane disposed between the anode and the cathode. In the anode, an oxidation reaction of Formula (1) occurs. In the cathode, a reductive reaction of Formula (2) occurs. In all of the single cells, an electrochemical reaction of Formula (3) occurs.

$$H_2 \rightarrow 2H^+ + 2e^- \quad (1)$$

$$(½)O_2 + 2H^+ + 2e^- \rightarrow H_2O \quad (2)$$

$$H_2 + (½)O_2 \rightarrow H_2O \quad (3)$$

The fuel cell 2 outputs DC power with the electrochemical reaction, The DC power is converted into three-phase AC power by an inverter (not illustrated), and then is supplied to the AC motor.

The fuel cell system 1 further includes a first tank 31, a second tank 32, a first path 41, and a second path 42, as devices for supplying hydrogen gas to the fuel cell 2.

The first tank 31 and the second tank 32 each are a container for storing hydrogen gas therein. The first tank 31 and the second tank 32 each are formed by winding carbon fiber impregnated with thermosetting resin, such as epoxy resin, by a filament winding method.

The first path 41 is provided to guide hydrogen gas into the first tank 31 and the second tank 32. The first path 41 is connected at its one end to a supply port 411, and branches to extend to the first tank 31 and the second tank 32. The supply port 411 is 110 an inlet of the first path 41, and is disposed in an outer surface of the vehicle 100. The supply port 411 is provided with a lid (not illustrated), so that the supply port 411 can be opened and closed by the lid.

The second path 42 is provided to supply hydrogen gas to the fuel cell 2 from the first tank 31 and the second tank 32. Paths from the first tank 31 and the second tank 32 merge into the second path 42, and extend to the fuel cell 2. In the second path 42, a first valve 51 and a second valve 52 are respectively provided at portions downstream of the first tank 31 and the second tank 32, and upstream of a merging portion. The first valve 51 and the second valve 52 each operate in response to a received control signal to open and close the second path 42.

The vehicle 100 receives supply of hydrogen gas at a hydrogen station, for example. Specifically, a connector provided at an end of a hose (not illustrated) is connected to the opened supply port 411 at the hydrogen station, and hydrogen gas is supplied through the hose and the connector. The hydrogen gas flowing into through the supply port 411 is guided into the first tank 31 and the second tank 32 through the first path 41, and then is stored inside the tanks.

The hydrogen gas stored inside the first tank 31 and the second tank 32 is guided to the fuel cell 2 through the second path 42 when at least one of the first valve 51 and the second valve 52 opens the second path 42. Then, air is guided to the fuel cell 2 through a path (not illustrated). The hydrogen gas is supplied to an anode of the fuel cell 2, and the air is supplied to a cathode of the fuel cell 2. This allows the hydrogen gas and oxygen in the air to be used for the aforementioned electrochemical reaction in the fuel cell 2.

The fuel cell system 1 further includes a supply port sensor 80, a first pressure sensor 81, a second pressure sensor 82, and a control device 9.

The supply port sensor 80 is provided in the supply port 411 to detect a state of the supply port 411. The supply port sensor 80 creates a detection signal based on a case where the supply port 411 is opened as well as when the supply port 411 is closed by the lid, and transmits the detection signal to the control device 9.

The first pressure sensor 81 and the second pressure sensor 82 each detect pressure of fluid. The first pressure sensor 81 is disposed in the first path 41, and the second pressure sensor 82 is disposed in the second path 42. This allows each of the first pressure sensor 81 and the second pressure sensor 82 to create a detection signal based on pressure of hydrogen gas in the path in which the corresponding pressure sensor is disposed, and to transmit the detection signal to the control device 9.

A part or the whole of the control device 9 is formed as an analog circuit, or formed as a digital processor. In any case, the control device 9 includes functional control blocks to serve to output a received signal based on a control signal.

FIG. 1 illustrates the control device 9 as functional control blocks. A software module to be installed into an analog circuit or a digital processor constituting the control device 9 is not necessarily split like the control blocks illustrated in FIG. 1. That is, an actual analog circuit and module may be configured to serve as the plurality of control blocks illustrated in FIG. 1, or may be further broken into blocks. As long as the control device 9 is configured to enable processing described below, an actual configuration thereof can he appropriately changed by a person skilled in the art.

The control device 9 includes a supply state determining unit 91, a sensor state determining unit 92, a power generation control unit 93, and a storage unit 94.

The supply state determining unit 91 is a functional unit that performs supply state determining control. As described below, the supply state determining control is performed to determine a supply state of hydrogen gas into the first tank 31 and the second tank 32.

The sensor state determining unit 92 is a functional unit that performs sensor state determining control. As described below, the sensor state determining control is performed to determine a state of each of the first pressure sensor and the second pressure sensor.

The power generation control unit 93 is a functional unit that controls power generation of the fuel cell 2. Specifically, the power generation control unit 93 controls power generation of the fuel cell 2 by changing a flow rate of hydrogen gas and air to be supplied to the fuel cell 2, and adjusting operation of the inverter. As a result, electric power to be supplied to the aforementioned AC motor is appropriately adjusted.

The storage unit 94 is a functional unit that stores various kinds of information, and is composed of nonvolatile memories, for example. The storage unit 94 preliminarily stores information such as maps, and the information is read out by the supply state determining unit 91, the sensor state determining unit 92, and the power generation control unit 93, to be used for predetermined calculation. The storage unit 94 also can store calculation results of the supply state determining unit 91, the sensor state determining unit 92, and the power generation control unit 93.

Figure 2:
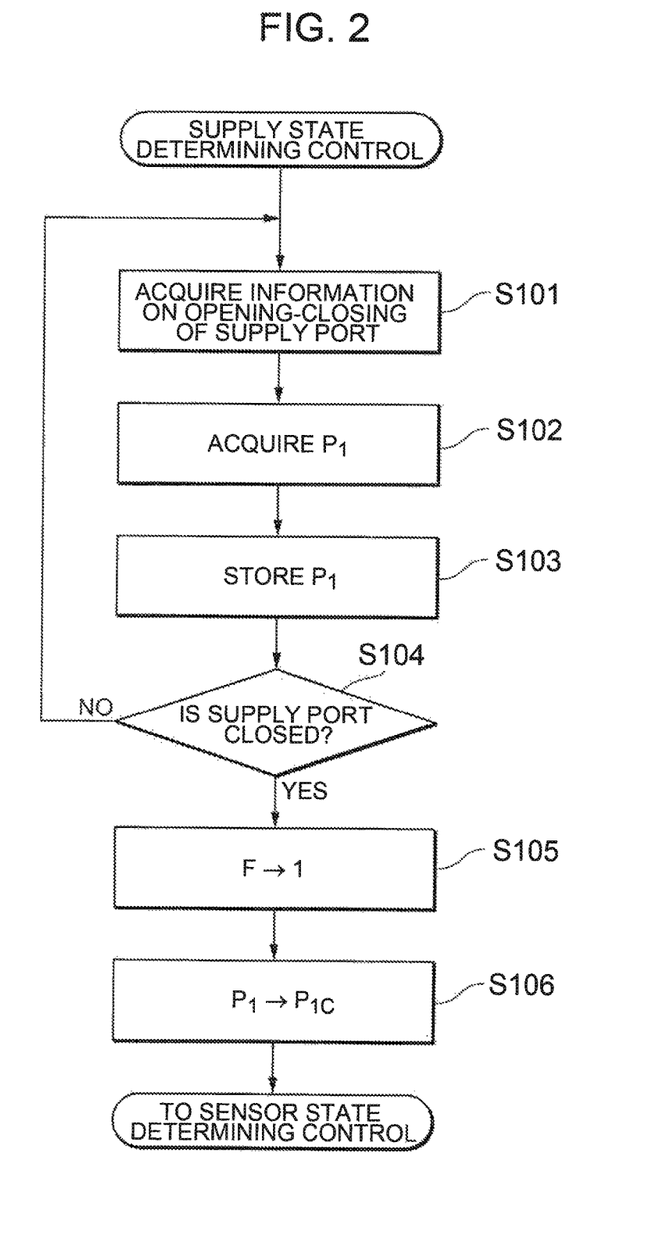
FIG. 2 is a flowchart showing supply state determining control.
Figure 3:
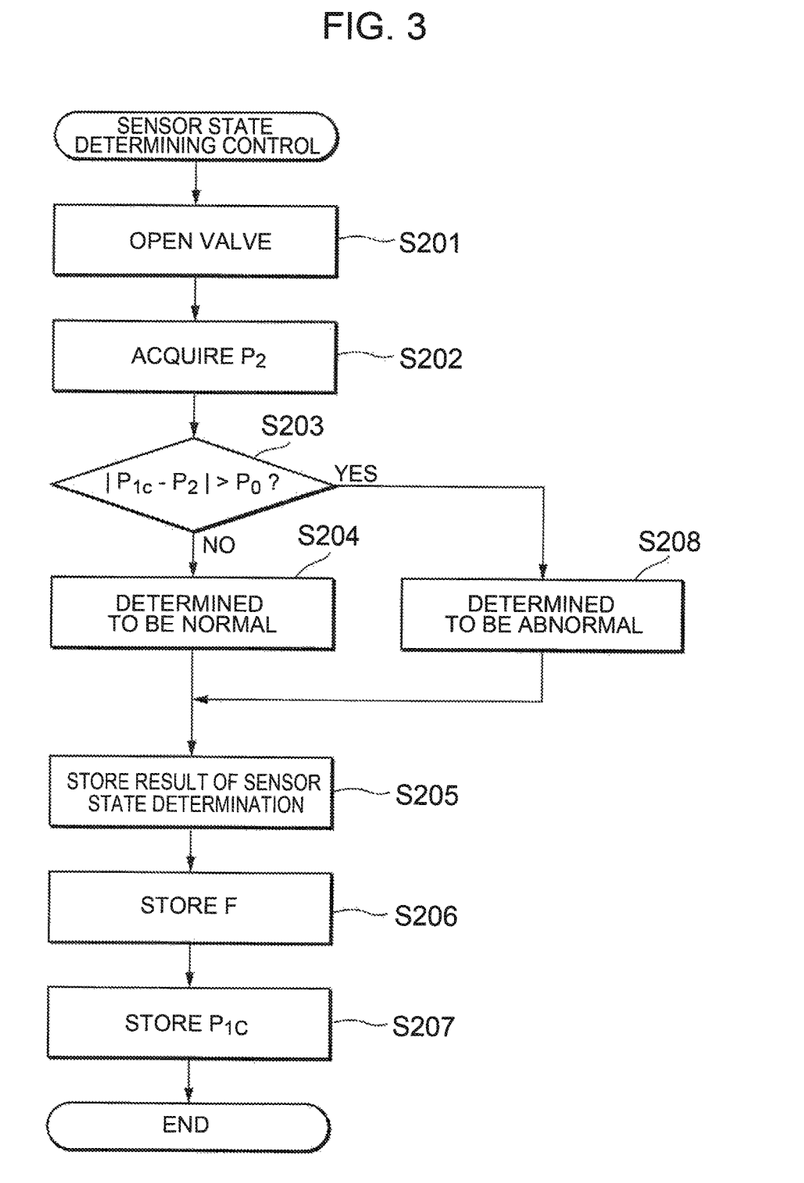
FIG. 3 is a flowchart showing sensor state determining control.
Figure 4:
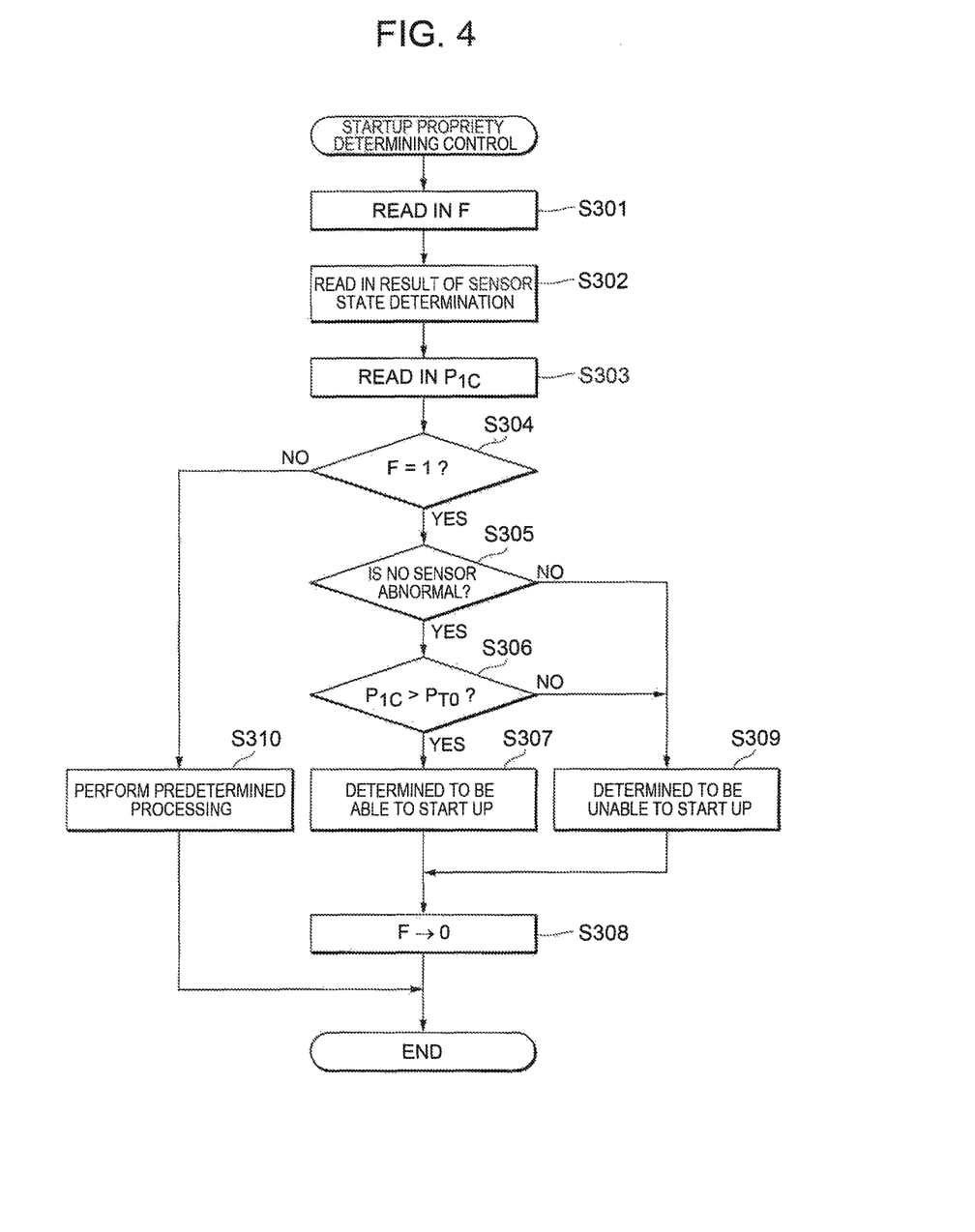
FIG. 4 is a flowchart showing startup propriety determining control.

Subsequently, control to be performed by the control device 9 will be described with reference to FIGS. 2 to 4. FIG. 2 is a flowchart showing supply state determining control. FIG. 3 is a flowchart showing sensor state determining control. FIG. 4 is a flowchart showing startup propriety determining control.

When detecting that the supply port 411 is opened based on a detection signal received from the supply port sensor 80, the supply state determining unit 91 of the control device 9 starts to perform the supply state determining control shown in FIG. 2. That is, the supply state determining unit 91 starts to perform the supply state determining control when supply of hydrogen gas through the supply port 411 is started at a hydrogen station or the like.

First, the supply state determining unit 91 acquires information on opening-closing of the supply port 411 at step S101. Specifically, the supply state determining unit 91 acquires information on whether the supply port 411 is opened or closed based on a detection signal received from the supply port sensor 80.

Next, the supply state determining unit 91 acquires pressure $P_1$ of hydrogen gas existing in the first path 41 at step S102. Specifically, the supply state determining unit 91 acquires the pressure $P_1$ by performing predetermined calculation based on a detection signal received from the first pressure sensor 81.

Subsequently, the supply state determining unit 91 allows the storage unit 94 to store the acquired pressure $P_1$ at step S103. The pressure $P_1$ stored in the storage unit 94 is updated every time when the supply state determining unit 91 performs processing at step S103.

Subsequently, the supply state determining unit 91 determines whether the supply port 411 is closed at step S104. Specifically, the supply state determining unit 91 makes the determination based on the information on opening-closing of the supply port 411, acquired at step S101. When it is determined that the supply port 411 is not closed (NO at S104), processing of the supply state determining unit 91 returns to that at step S101.

Meanwhile, when it is determined that the supply port 411 is closed (YES at S104), or that supply of hydrogen gas into the first tank 31 and the second tank 32 is completed, the processing of the supply state determining unit 91 proceeds to that at step S105.

Here, timing when the supply of hydrogen gas into the first tank 31 and the second tank 32 is completed is referred to as "supply complete timing".

Subsequently, the supply state determining unit 91 set a flag F to 1 at step S105. The flag F relates to startup of the fuel cell after the supply complete timing. Specifically, the flag F is set to 1 before a first startup of the fuel cell 2 after the supply complete timing, besides this the flag F is set to 0. In the present specification, the term, "startup of a fuel cell", means that the fuel cell 2 waiting for power generation starts the power generation.

Subsequently, the supply state determining unit 91 allows the storage unit 94 to store a final pressure $P_1$ as pressure $P_{1c}$ at step S106 after the supply complete timing, or after supply of hydrogen gas is completed.

When processing at step S106 is finished, the sensor state determining unit 92 of the control device 9 performs the sensor state determining control shown in FIG. 3. That is, the sensor state determining unit 92 starts to perform the sensor state determining control based on a case where supply of hydrogen gas through the supply port 411 is completed at a hydrogen station or the like.

First, the sensor state determining unit 92 transmits a control signal to the first valve 51 and the second valve 52 at step S201 to open the valves. This allows hydrogen gas to be supplied from the first tank 31 and the second tank 32 through the second path 42.

Next, the sensor state determining unit 92 acquires pressure $P_2$ of hydrogen gas existing in the second path 42 at step S202. Specifically, the sensor state determining unit 92 acquires the pressure $P_2$ by performing predetermined calculation based on a detection signal received from the second pressure sensor 82.

Subsequently, the sensor state determining unit 92 determines whether an absolute value of a difference between the pressure $P_{1c}$ and the pressure $P_2$ is more than a threshold value $P_0$, at step S203. When the first pressure sensor 81 and the second pressure sensor 82 are normal, the pressure $P_{1c}$ and the pressure $P_2$ detected by the corresponding sensors are almost equal to each other. Thus, when it is determined that the absolute value of the difference is not more than the threshold value $P_0$ (NO at S203), processing of the sensor state determining unit 92 proceeds to that of step S204, and then it is determined that the first pressure sensor 81 and the second pressure sensor 82 are normal.

Meanwhile, in step S203, when it is determined that the absolute value of the difference between the pressure $P_{1c}$ and the pressure $P_2$ is more than the threshold value $P_0$ (YES at S203), the processing of the sensor state determining unit 92 proceeds to that of step S208, and then it is determined that at least one of the first pressure sensor 81 and the second pressure sensor 82 is abnormal.

The sensor state determining unit 92 after processing at step S204 or step S208 is finished allows the storage unit 94 to store a determination result (hereinafter this determination result is referred to as a "sensor state determination result") at step S205.

Subsequently, the sensor state determining unit 92 allows the storage unit 94 to store a value of the flag F at step S206. In addition, the sensor state determining unit 92 allows the storage unit 94 to store the pressure $P_{1c}$ at step S207. From step S205 to step S207, the storage unit 94 being nonvolatile memories or the like stores information, so that the information is maintained even while a power source of the vehicle 100 is turned off. The information will be referred at a subsequent startup of the vehicle 100.

The power generation control unit 93 of the control device 9 starts to perform the startup propriety determining control shown in FIG. 4 at startup of the vehicle 100. Specifically, the power generation control unit 93 starts to perform the startup propriety determining control based on a case where an ignition key (not illustrated) of the vehicle 100 is switched from an off-state to an on-state. The startup propriety determining control is performed to determine whether the fuel cell 2 can be started up.

First, the power generation control unit 93 reads in the flag F at step S301. As described above, the flag F relates to startup of the fuel cell after the supply complete timing.

Next, the power generation control unit 93 reads out a sensor state determination result from the storage unit 94 at step S302.

Subsequently, the power generation control unit 93 reads out the pressure $P_{1c}$ of hydrogen gas at the supply complete timing from the storage unit 94 at step S303.

Subsequently, the power generation control unit 93 determines whether the flag F is set to 1, at step S304. When the flag F is set to 1 (YES at S304), or before a first startup of the fuel cell 2 after the supply complete timing, processing of the power generation control unit 93 proceeds to that of step S305.

Subsequently, the power generation control unit 93 determines whether there is abnormality in the first pressure sensor 81 and the second pressure sensor 82, at step S305. The power generation control unit 93 makes the determination based on the sensor state determination result read in at step S302. When it is determined that at least one the first pressure sensor 81 and the second pressure sensor 82 is abnormal (YES at S305), processing of the power generation control unit 93 proceeds to that of step S306.

Subsequently, the power generation control unit 93 determines whether the pressure $P_{1c}$ is more than the threshold value $P_{T0}$, at step S306. The pressure $P_{1c}$ is pressure of hydrogen gas at the supply complete timing, and is almost equal to pressure of hydrogen gas inside the first tank 31 and the second tank 32. The threshold value $P_{T0}$ corresponds to pressure of hydrogen gas at the time when the amount of the hydrogen gas for appropriately operating the fuel cell 2 is stored inside the first tank 31 and the second tank 32, and is set to about 3.1 MPa, for example. When the pressure $P_{1c}$ is more than the threshold value $P_{T0}$ (YES at S306), or when a sufficient amount of hydrogen gas is stored inside the first tank 31 and the second tank 32, processing of the power generation control unit 93 proceeds to that of step S307, and then it is determined that the fuel cell 2 can be started up. As a result, the power generation control unit 93 starts up the fuel cell 2.

Meanwhile, when it is determined that at least one of the first pressure sensor 81 and the second pressure sensor 82 is abnormal, step S305 (NO at S305), or when it is determined that the pressure $P_{1c}$ is not more than the threshold value $P_{T0}$, at step S306 (NO at S306), processing of the power generation control unit 93 proceeds to that of step S309, and then it is determined that the fuel cell 2 cannot be started up. As a result, the power generation control unit 93 does not allow the fuel cell 2 to start up.

The power generation control unit 93 after processing at step S307 or at step S309 is finished sets the flag F to 0 at step S308. When the flag F is not set to 1 at step S304; the power generation control unit 93 performs the sensor state determining control or predetermined processing without using the pressure $P_{1c}$.

Subsequently, operation effect by the fuel cell system 1 will be described. According to the structure described above, the sensor state determining unit 92 performs the sensor state determining control before the first startup of the fuel cell 2 after the supply complete timing being timing when supply of hydrogen gas into the first tank 31 and the second tank 32 is completed. The sensor state determining control is performed based on the pressure $P_{1c}$ detected by the first pressure sensor 81 at the supply complete timing, and the pressure $P_2$ detected by the second pressure sensor 82 by opening the first valve 51 and the second valve 52.

Then, the power generation control unit 93 starts up the fuel cell 2 only when the sensor state determining unit 92 determines that the first pressure sensor 81 and the second pressure sensor 82 are normal, and when hydrogen gas sufficient for starting up the fuel cell 2 exists inside the first tank 31 and the second tank 32. Thus, according to the above structure, a result of the sensor state determining control can be used for startup of the fuel cell 2.

The sensor state determining unit 92 starts to perform the sensor state determining control based on a case where the supply complete timing arrives. According to this configuration, the sensor state determining control can be started to be performed before the first startup of the fuel cell 2 after the supply complete timing. As a result, a result of the sensor state determining control can be reliably used for startup of the fuel cell 2.

In addition, the sensor state determining unit 92 determines that at least one of the first pressure sensor 81 and the second pressure sensor 82 is abnormal when a difference between the pressure $P_{1c}$ and the pressure $P_2$ is more than the predetermined threshold value $P_0$. According to this configuration, abnormality of at least one of the first pressure sensor 81 and the second pressure sensor 82 can be reliably determined.

The supply state determining unit 91 may determine that supply of hydrogen gas into the first tank 31 and the second tank 32 is completed based on a case where the supply port 411 which is the inlet of the first path 41 is closed. According to this configuration, the supply state determining unit 91 can reliably determine completion of supply of hydrogen gas into the first tank 31 and the second tank 32, with a simple structure.

The fuel cell system 1 includes the storage unit 94 that stores at least one of the pressure $P_1$ and the pressure $P_2$. While the pressure $P_1$ is stored in the storage unit 94 in the embodiment described above, the pressure $P_2$ may be stored in the storage unit 94 together with the pressure $P_1$ or instead of the pressure $P_1$. The power generation control unit 93 starts up the fuel cell 2 only when at least one of the pressure $P_1$ and the pressure $P_2$ stored in the storage unit is more than the predetermined threshold value $P_{T0}$. According to this configuration, the power generation control unit 93 starts up the fuel cell 2 when a sufficient amount of hydrogen gas is stored inside the first tank 31 and the second tank 32. As a result, startup of the fuel cell 2 in spite of only a little amount of hydrogen gas stored inside the first tank 31 and the second tank 32 can be prevented, so that unnecessary electric power consumption can be reduced.

All of the supply state determining unit 91, the sensor state determining unit 92, and the power generation control unit 93 are provided in the single control device 9. According to this configuration, a result of the sensor state determining control can be acquired without performing unnecessary communication among the supply state determining unit 91, the sensor state determining unit 92, and the power generation control unit 93.

As described above, the embodiment of the present disclosure has been described with reference to the specific examples. However, the present disclosure is not limited to the specific examples. That is, as far as having a feature of the present disclosure, a modification in which a person skilled in the art appropriately makes a design change to these specific examples is included in the scope of the present disclosure. Each of elements provided in the corresponding one of the specific examples described above, and its arrangement, material, condition, shape, size, and the like, are not limited to the examples shown, and may be appropriately changed.

What is claimed is:

1. A fuel cell system comprising:
   a fuel cell configured to generate electric power by an electrochemical reaction with supplied hydrogen gas;
   a tank in which hydrogen gas is stored;
   a first path through which hydrogen gas is supplied into the tank;
   a first pressure sensor configured to detect pressure of hydrogen gas in the first path;
   a second path through which hydrogen gas is supplied from the tank to the fuel cell;
   a second pressure sensor configured to detect pressure of hydrogen gas in the second path;
   a valve configured to open and close the second path in response to a received control signal; and
   a control device configured to receive a detection signal from each of the first pressure sensor and the second pressure sensor, and to transmit a control signal to control the valve, wherein
   the control device includes a supply state determining unit configured to perform supply state determining control for determining a supply state of hydrogen gas to the tank, a sensor state determining unit configured to perform sensor state determining control for determining a state of each of the first pressure sensor and the second pressure sensor, and a power generation control unit configured to control power generation of the fuel cell,
   the sensor state determining unit is configured to perform the sensor state determining control before a first startup of the fuel cell after supply complete timing being timing when supply of hydrogen gas into the tank is completed, based on first pressure detected by the first pressure sensor at the supply complete timing, and second pressure detected by the second pressure sensor after the valve is opened, and
   the power generation control unit is configured to start up the fuel cell only when the sensor state determining unit determines that a difference between the first pressure sensor and the second pressure sensor is no more than a predetermined difference.

2. The fuel cell system according to claim 1, wherein
   the sensor state determining unit is configured to start to perform the sensor state determining control in response to receiving the supply complete timing indicating that supply of hydrogen gas into the tank is completed.

3. The fuel cell system according to claim 2, wherein
   the sensor state determining unit is configured to determine an abnormal state of at least one of the first pressure sensor and the second pressure sensor when a difference between the first pressure and the second pressure is more than the predetermined difference.

4. The fuel cell system according to claim 2, wherein
   the supply state determining unit is configured to determine that supply of hydrogen gas into the tank is completed based on a case where an inlet of the first path is closed.

5. The fuel cell system according to claim 2, further comprising a storage unit configured to store at least one of the first pressure and the second pressure, wherein
   the power generation control unit is configured to start up the fuel cell only when at least one of the first pressure and the second pressure stored in the storage unit is more than a predetermined value.

6. The fuel cell system according to claim 1, wherein
   all of the supply state determining unit, the sensor state determining unit, and the power generation control unit are provided in a single control device.

* * * * *